(12) United States Patent
Svenson et al.

(10) Patent No.: US 6,578,226 B2
(45) Date of Patent: Jun. 17, 2003

(54) APPLICATOR FOR INSIDE CLEANING OF PIPE AND HOSE

(75) Inventors: Jan Svenson, Huskvarna (SE); Robert Axelsson, Granna (SE)

(73) Assignee: Eurocomp AB, Avesta (SE)

( * ) Notice: Subject to any disclaimer, the term of this patent is extended or adjusted under 35 U.S.C. 154(b) by 0 days.

(21) Appl. No.: 09/946,379

(22) Filed: Sep. 6, 2001

(65) Prior Publication Data

US 2002/0066146 A1 Jun. 6, 2002

(30) Foreign Application Priority Data

Mar. 1, 2000 (SE) ............................................ 9900806-2

(51) Int. Cl.[7] .............................. B08B 9/04; B08B 9/055
(52) U.S. Cl. ...................................... 15/3.5; 15/104.061
(58) Field of Search ..................... 15/3.5, 3.51, 104.061

(56) References Cited

U.S. PATENT DOCUMENTS

| 4,467,488 A | | 8/1984 | Creek |
| 4,974,277 A | | 12/1990 | Casella |
| 5,555,585 A | * | 9/1996 | Fowler |
| 5,640,734 A | | 6/1997 | Kuwashima |
| 5,974,611 A | * | 11/1999 | Casella |

FOREIGN PATENT DOCUMENTS

| DE | 3508590 A1 | 9/1986 |
| SE | 8405605-0 | 6/1987 |
| WO | WO 92/02310 | 2/1992 |
| WO | WO 96/18465 | 6/1996 |

* cited by examiner

Primary Examiner—Randall E. Chin

(57) ABSTRACT

An applicator for cleaning the inside of pipes and hoses is disclosed. The applicator comprises a pressure chamber and a lid which is adjustable between open and closed positions, sealing the pressure chamber in the closed position. A sealed plane interfaces is provided between the pressure chamber and the lid which is guided for displacement transversely of the axis of the nozzle between the open and closed positions and is connected to a valve controlled double acting pneumatic cylinder for effecting the displacement. A nozzle to be connected to the pipe or the hose, is provided on the lid and in the closed position thereof communicates with the pressure chamber to be connected to a compressed air source through a valve for propulsion of a rinse projectile inserted into the nozzle, when the lid is open, through the pipe or the hose by means of compressed air being supplied to the pressure chamber with the lid in the closed position.

14 Claims, 4 Drawing Sheets

APPLICATOR FOR INSIDE CLEANING OF PIPE AND HOSE

FIELD OF THE INVENTION

The present invention relates to an applicator for cleaning of pipe and hose.

DESCRIPTION OF THE PRIOR ART

The fast and advanced development in many technical areas, e.g. hydraulics, has entailed that systems within these areas have become more sensitive to pollutions, since they work under high pressure, small tolerances and components, whose functions are carefully calculated. Radically intensified demands are thereby put upon these systems concerning cleanness.

When a pipe or a hose is cut off, the release of metal or rubber particles, splinters, burrs, dust etc. being left inside the pipe or the hose is inevitable. These pollutions cause unnecessary wearing on the systems with great additional costs as a result, and must therefore be removed in an efficient way. For this purpose a method has been developed for inside mechanical cleaning of pipe or hose, wherein a rinse projectile made of polymer material is compressed and shot through the pipe or the hose by means of a pneumatic applicator. The elasticity of the material and the friction on the inside of the pipe or the hose in combination with the force of the compressed air give unsurpassed effective and quick cleaning. This method is applied in the system JETCLEANER, introduced by Eurocomp AB, Avesta, Sweden, which includes an applicator comprising a pressure chamber with a lid adjustable between open and closed positions, sealing the pressure chamber in the closed position, and a nozzle to be connected to the pipe or the hose, said nozzle being mounted to the lid and in the closed position thereof communicating with the pressure chamber to be connected to a compressed air source through a valve for propulsion of a rinse projectile inserted into the nozzle with the lid in the open position, the charging position, through the pipe or the hose by means of compressed air being supplied to the pressure chamber with the lid in the closed position, the firing position.

With JETCLEANER a documented effective inside cleaning of pipe and hose is achieved but the applicator used in the system by some users is regarded as less suitable from an ergonomical point of view. The insertion of the rinse projectile into the nozzle is ergonomically unfavorable since the lid pivotally journalled on the applicator must be turned manually to an open position after a spring loaded latching clasp keeping the lid in the closed position, having been manually actuated for unlocking the lid.

The purpose of the invention is to provide an applicator of the kind mentioned above, having a semi-automatic design and satisfying the demands for good ergonomics better than the prior art applicator mentioned above. For said purpose the applicator according to the invention is characterized in that a sealed plane interface is provided between the pressure chamber and the lid which is guided for displacement transversely of the axis of the nozzle between open and closed positions, and that the lid is connected to a valve controlled double-acting pneumatic cylinder for effecting said displacement.

In another respect, the known applicator is constructed in an inappropriate way from an ergonomical point of view: the applicator has a handle, directed downwards in the transverse direction of the axis of the nozzle, which is unfavorable considering the force to be exerted in order to hold the applicator with the nozzle applied against the end of the pipe or the hose when firing the 'shot', the rinse projectile under the effect of the released compressed air being forced through the pipe or the hose. This inconvenience is overcome according to the invention in that the handle in the preferred embodiment of the applicator according to the invention protrudes from the applicator on the side of the pressure chamber, opposite to the nozzle, substantially in the axial direction of the nozzle.

The invention also relates to an improved rinse projectile. In known embodiments the rinse projectile consists of a cylindrical body, punched out of a plate of elastic polyurethane foam, the projectile therefore having a porous structure on the envelope surface as well as on the end surfaces. The polyurethane foam consists of pieces of polyurethane foam with different density glued together, so that the rinse projectile has both harder and softer sections. The rinse projectile is compressed when it is inserted into the nozzle, and during its passage through the pipe or the hose it wipes off the inside thereof and absorbs occurring liquid like a sponge, but one drawback is that the rinse projectile may release polyurethane particles in the pipe or the hose. The improved rinse projectile according to the invention is characterized in that the cylindrical body of porous polymer is manufactured by molding and has a skin on the envelope surface of the body.

BRIEF DESCRIPTION OF THE DRAWINGS

An illustrative embodiment of the applicator according to the invention will be described in more detail in the following with reference to the accompanying drawings, in which.

DETAILED DESCRIPTION OF THE INVENTION

Figure 1:
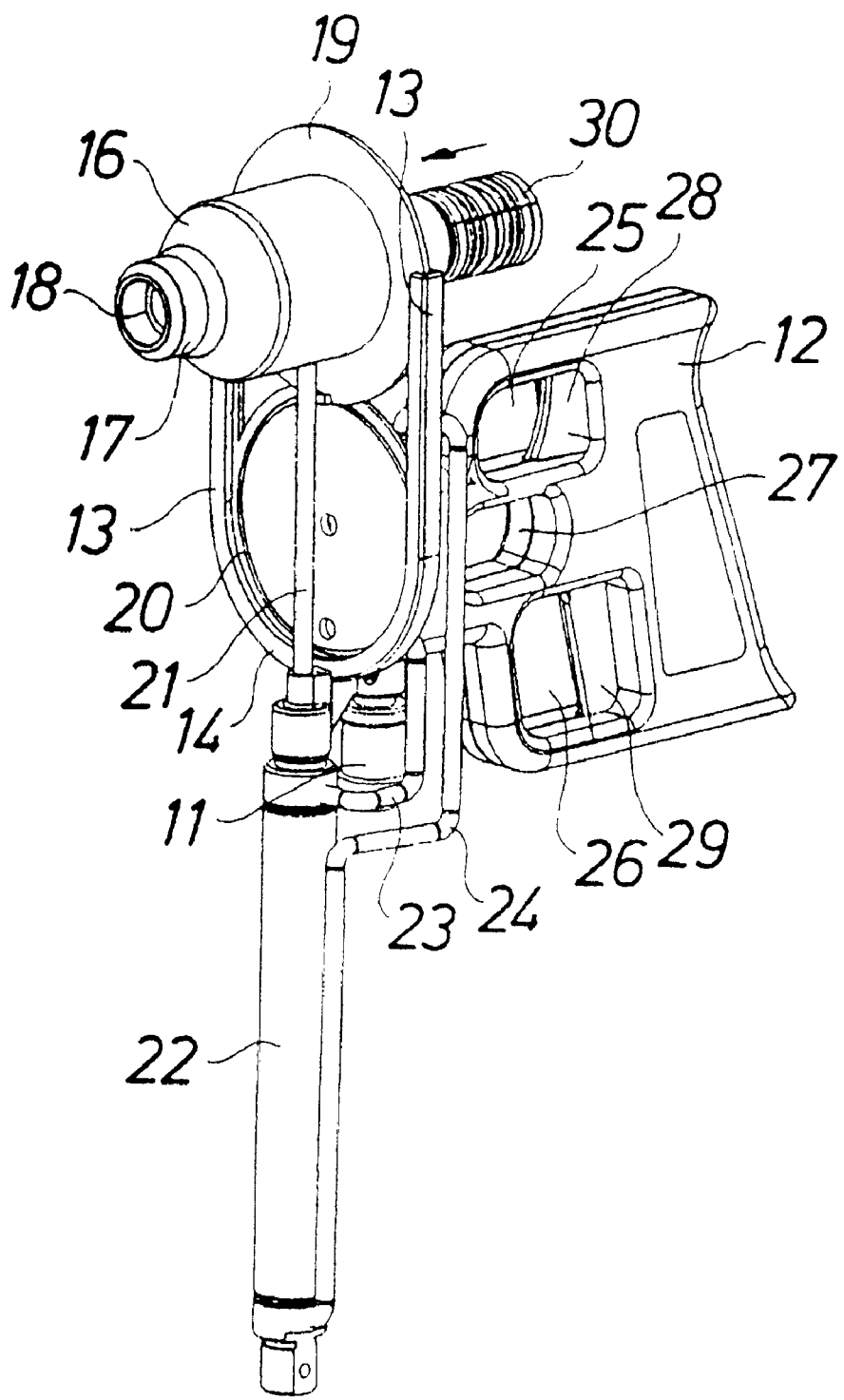
FIG. 1 is a perspective view of the applicator with rinse projectile, taken obliquely from the front in the charging position.

The applicator includes a housing 10, forming a pressure chamber with connector 11 for connection of the pressure chamber to a compressed air source (compressor) The housing 10 is made integral with a handle 12 of a suitable plastic material, e.g. nylon reinforced with glass fibre. Two channelled guide rails 13, interconnected by a channelled semi-circular web 14 and staged against each other by a semi-circular brace 15, are made integral with the rest of the applicator and thus also are made of plastic. A nozzle 16, having a hollow stud 17, dimensioned to fit outside the pipe or the hose to be cleaned, has an inside shoulder 18, to be applied against the ring-shaped end surface of the pipe or the hose and having slightly greater height than the wall thickness of the pipe or the hose. On the nozzle 16 a circular radially protruding flange 19 is provided, which at the circumference thereof is received in the channelled guide rails 13 and is guided therein for displacement between the charging position shown in FIGS. 1 and 2, and the firing position shown in FIG. 3. The housing 10 and the flange 19 have a plane interface, a gasket ring 20 being provided in the housing 10 to seal between the housing and the nozzle flange. For displacement of the nozzle 16 between the upper position or the charging position, in FIGS. 1 and 2, and the closed position or the firing position according to FIG. 3, the nozzle is connected to the piston rod 21 of a double-acting pneumatic cylinder 22. The cylinder 22 is connected by means of pipes 23 and 24 to a valve in the housing 10 for controlling the flow of compressed air through the connector 11 to the cylinder, and a valve for controlling the air supply to the pressure chamber, also through the connector 11, is also provided in the housing. The handle 12 forms an upper grip opening 25, a lower grip opening 26, and an intermediate grip opening 27. A trigger 28 connected to the valve for the pressure chamber is provided in the grip opening 25, and a trigger 29 connected to the valve for the pneumatic cylinder 22 is provided in the grip opening 26, while the intermediate grip opening 27 lacks a trigger. When holding the handle 12 in the hand, the middle finger shall be inserted into the intermediate grip opening 27, while the forefinger is inserted into the upper grip opening 25 for operating the trigger 28 by the forefinger, and the ring finger and the little finger are inserted into the grip opening 26 for operating the trigger 29 by said finger. By the support offered for the middle finger in the grip opening 27 accidental shots are avoided when the trigger 29 is actuated. The grip opening 27 is displaced forward relative to the grip openings 25 and 26 for stabilization of the forefinger movement when actuating the trigger 28.

Figure 2:
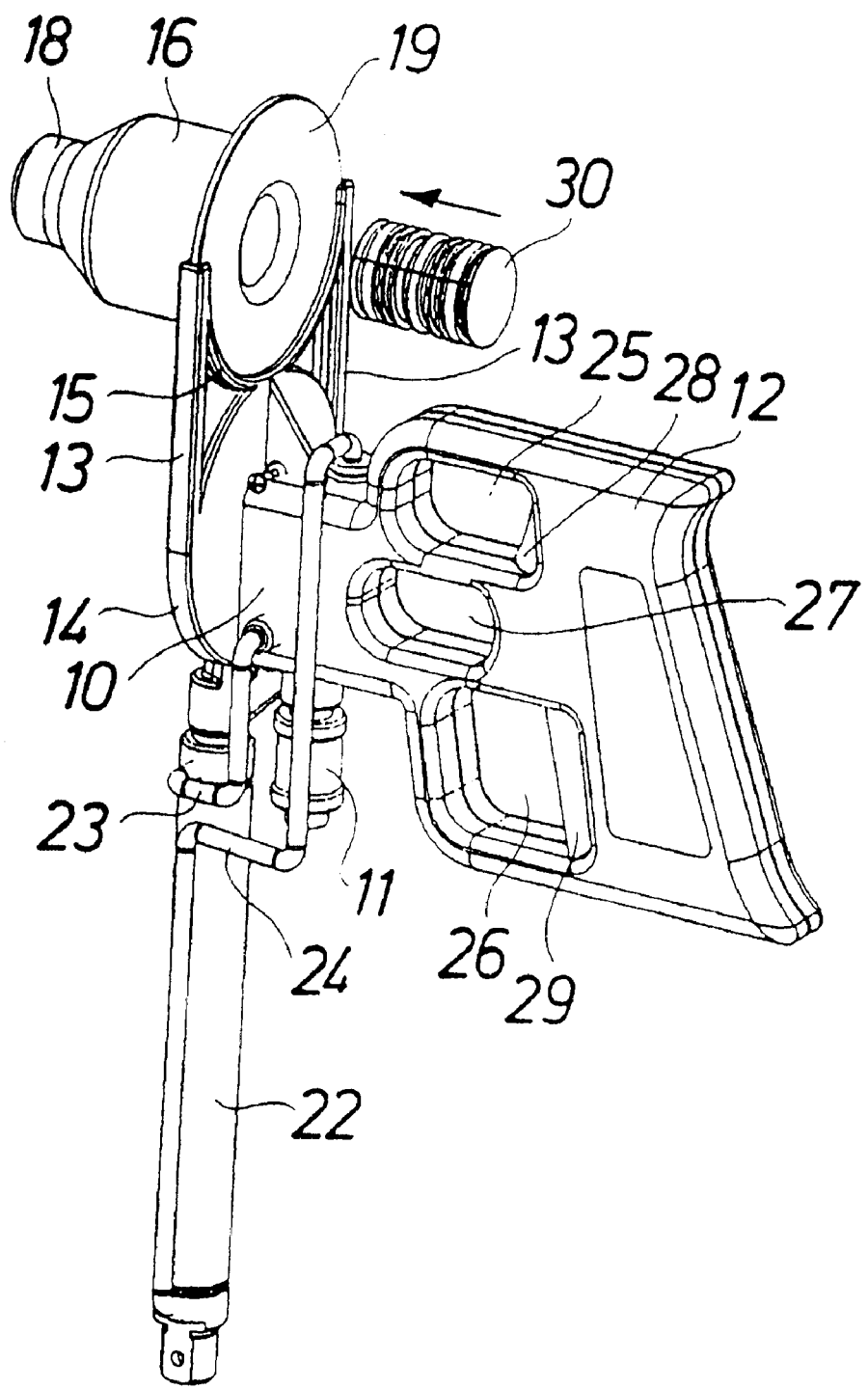
FIG. 2 is a perspective view of the applicator with rinse projectile, taken obliquely from behind in the charging position.
Figure 3:
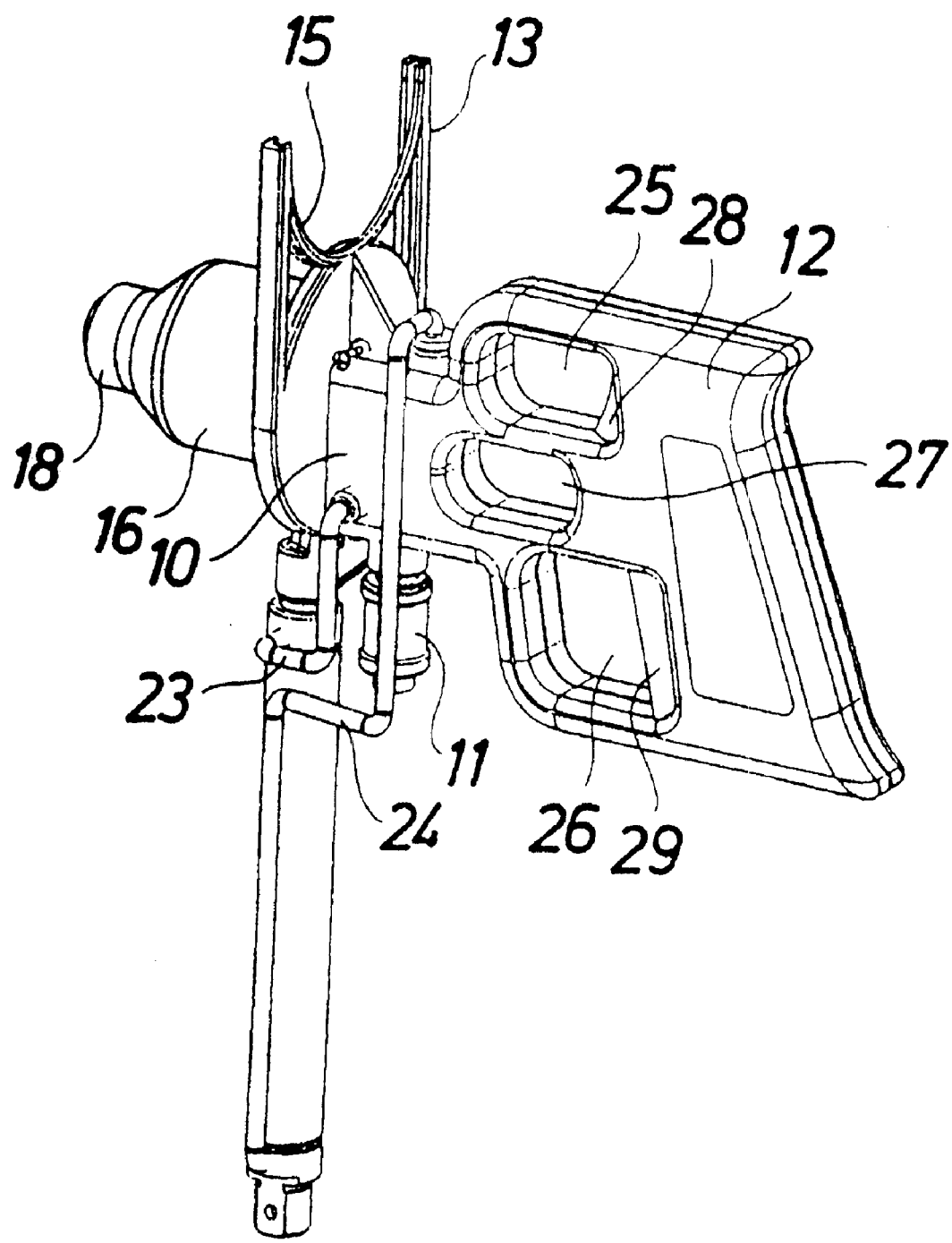
FIG. 3 is a perspective view similar to FIG. 2 but with the applicator in the firing position.

With the nozzle 16 in the charging position according to FIGS. 1 and 2 a rinse projectile 30 is inserted into the nozzle, whereupon the nozzle by means of the pneumatic cylinder 22 is displaced to the firing position according to FIG. 3. The end of the pipe or the hose which is to be cleaned, is inserted into the tubular stud 17 of the nozzle, and the shoulder surface 18 of the applicator is pressed against the ring-shaped end surface of the pipe or the hose and by means of the handle is pressed against the end surface. The rinse projectile will be pressed through the pipe or the hose when compressed air is supplied to the pressure chamber, and then will remove pollutions from the inside surface of the pipe or the hose. Since the handle is arranged on the back side of the pressure chamber substantially axially in line with the nozzle when this is in firing position, it is easy to keep the applicator pressed against the pipe or the hose, when the pressure chamber is supplied with compressed air for "firing off" the rinse projectile. The pressure exerted on the handle then can also be sufficiently heavy for maintenance of necessary tightening between the nozzle and the housing and between the nozzle and the pipe or the hose. Since the handle and the housing are made of plastic, the applicator can have a low weight and thereby is easy to work with. For displacement of the nozzle between the charging position and the firing position no other manipulations than actuating the trigger 29 are required. The pneumatic cylinder 22 performs the required displacement. The applicator is thus semi-automatic.

Figure 4:
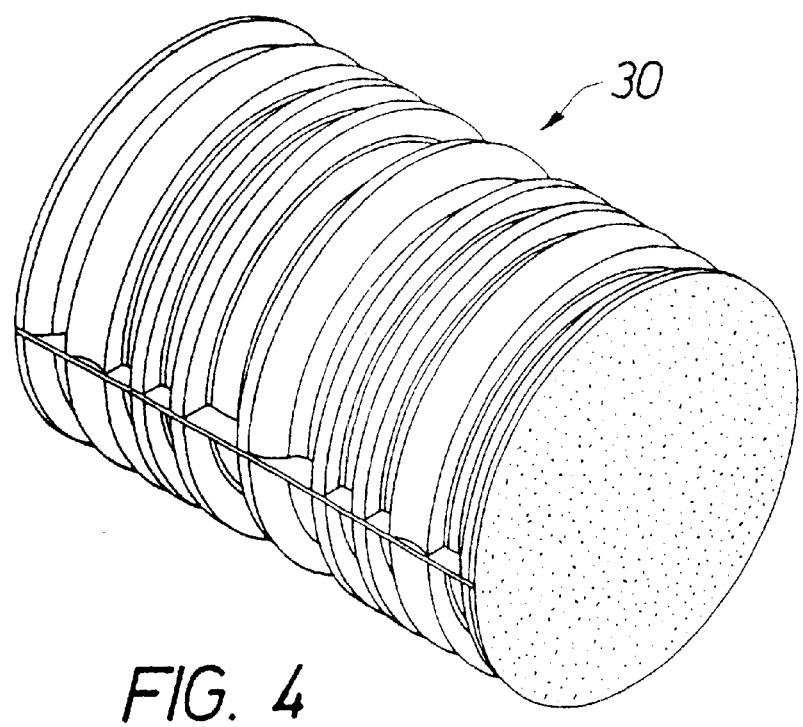
FIG. 4 is an enlarged perspective view of the rinse projectile and FIG. 5 is a side view of the rinse projectile.
Figure 5:
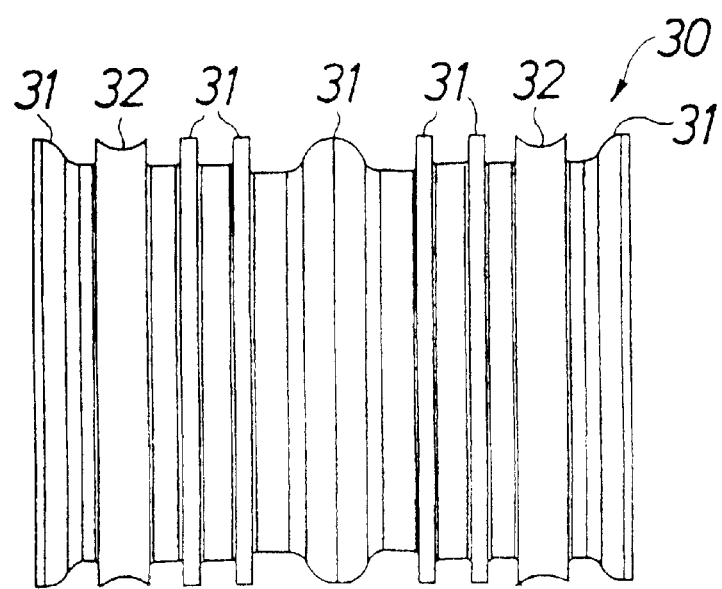

The rinse projectile used in the applicator may be of the prior art embodiment mentioned above, but it is preferred to use a projectile of the kind shown in FIGS. 4 and 5. When manufacturing this rinse projectile, a rod of e.g. polyurethane foam is found in a mold, the rod obtaining an outward skin by the contact with the boundary surface of the mold. The rod is then cut into rinse projectiles of desired length, whereby the end surfaces of these rinse projectiles will have a porous structure, so that the rinse projectile has the capability to absorb liquid at its end surfaces. The rinse projectile at the outside surface thereof is shaped with a number of annular beads to which desired stiffness can be imparted by appropriate choice of the thickness of the skin together with the shape and dimension of the annular beads. In the shown embodiment the annular beads 31 are softer annular beads, while the annular beads 32 are stiffer beads. The stiffer annular beads are able to scrape off pollutions from the inside surface of the pipe or the hose, while the softer annular beads wipes off the inside surface during the movement of the rinse projectile through the pipe or the hose.

The handle 12 may be excluded and the triggers 28 and 29 arranged therein may be replaced by pneumatic cylinders for the operation of the valves in a stationary embodiment of the applicator, whereby this can be arranged as a relatively cheap line robot as compared with the present stationary constructions.

In the shown embodiment of the applicator each nozzle 16 has a flange 19 which always fits between the guide rails 13 independently of the dimension of the nozzle. However, it is also possible to arrange the lid 19 as a separate part, which fits into the guide rails and in which nozzles of different dimensions may be inserted.

What is claimed is:

1. An applicator for cleaning of pipe and hose, comprising:

a pressure chamber with a lid, adjustable between open and closed positions, sealing the pressure chamber in the closed position;

a nozzle to be connected to the pipe or hose, said nozzle being mounted to the lid and in the closed position thereof communicating with the pressure chamber to be connected to a compressed air source through a valve for propulsion of a rinse projectile inserted into the nozzle with the lid in the open position, through the pipe or hose by means of compressed air being supplied to the pressure chamber with the lid in the closed position; and a sealed plane interface provided between the pressure chamber and the lid, the lid being guided for displacement in the plane of the interface transversely of the axis of the nozzle between open and closed positions, the lid being connected to a valve controlled double-acting pneumatic cylinder for effecting said displacement.

2. The applicator according to claim 1, further comprising:

a handle provided on the applicator protruding from the applicator on the side of the pressure chamber opposite to the nozzle, substantially in the axial direction of the nozzle.

3. The applicator according to claim 2, wherein triggers are provided in the handle connected to the valves for the pressure chamber and the double-acting pneumatic cylinder.

4. The applicator according to claim 3, wherein the triggers are arranged in separate grip openings in the handle, one above the other.

5. The applicator according to claim 4, wherein the grip openings for the triggers are arranged above and below, respectively, a central grip opening without a trigger.

6. The applicator according to claim 1, wherein the lid at the circumference thereof is received by mutually spaced channeled guide rails on the applicator.

7. The applicator according to claim 6, wherein the lid is circular.

8. The applicator according to claim 7, wherein the guide rails join a semi-circular channeled web interconnecting the rails, the circumference of the lid in the closed position thereof being received by this web between the guide rails.

9. The applicator according to claim 1, wherein the lid forms a radially protruding flange on the nozzle.

10. The applicator according to claim 9, wherein the flange on the nozzles having different dimensions to match pipes and hoses of different diameters, has a unitary diameter to fit into the guide rails.

11. The applicator according to claim 1, wherein the rinse projectile is shaped as an elastic cylindrical body of porous polymer, the cylindrical body being molded and having a skin on an envelope surface of the body.

12. The applicator according to claim 11, wherein the cylindrical body is cut off from a molded rod to have end surfaces with a porous structure.

13. The applicator according to claim 11, wherein the cylindrical body forms outside annular beads.

14. The applicator according to claim 13, wherein the annular beads have a stiffness adjusted by the thickness of the skin and the shape and dimension of the annular beads.

* * * * *